April 10, 1956     J. R. COX     2,741,483
PUSHER CONSTRUCTION
Filed July 24, 1953

INVENTOR.
JOHN R. COX
BY

United States Patent Office

2,741,483
Patented Apr. 10, 1956

2,741,483

PUSHER CONSTRUCTION

John R. Cox, Cleveland, Ohio

Application July 24, 1953, Serial No. 370,008

4 Claims. (Cl. 279—46)

My invention relates to pushers or feeders for stock fed into a machine tool, such as an automatic screw machine.

An object of my invention is to provide a pusher having its forward end constructed to accommodate itself to the thrust between the pusher and the rear end of the terminal piece of stock held by a collet and released from the pusher.

Another object is the provision in the construction of a pusher for cushioning the shock produced by relative movement toward each other of the pusher and a released terminal piece of stock.

Another object is the provision for accommodating the differential in the rotary movements of a pusher and a terminal piece of stock, after the release of the terminal piece of stock from the pusher.

Another object is the provision for arranging the forward end surface of a pusher in a manner such that thrust between the pusher and the rear end of a terminal piece of stock held by the collet is largely absorbed by the resilient fingers at the forward end of the pusher.

Still another object is the provision of a construction in a pusher for the feeding of stock to a collet such that the major component of force set up by axial thrust between the pusher and terminal piece of stock is radially directed against the resilient fingers of the pusher.

A still further object is the provision for making a gradual and cushioned contact between a pusher and a piece of stock moved rearwardly against the pusher by a collet.

There are benefits and advantages accruing to the construction herein disclosed and described which will become apparent to those acquainted with the construction and use of pushers for machine tools.

Other objects and a fuller understanding may be had of the invention by referring to the following description and claims, taken in conjunction with the accompanying drawing, in which:

Figure 1:
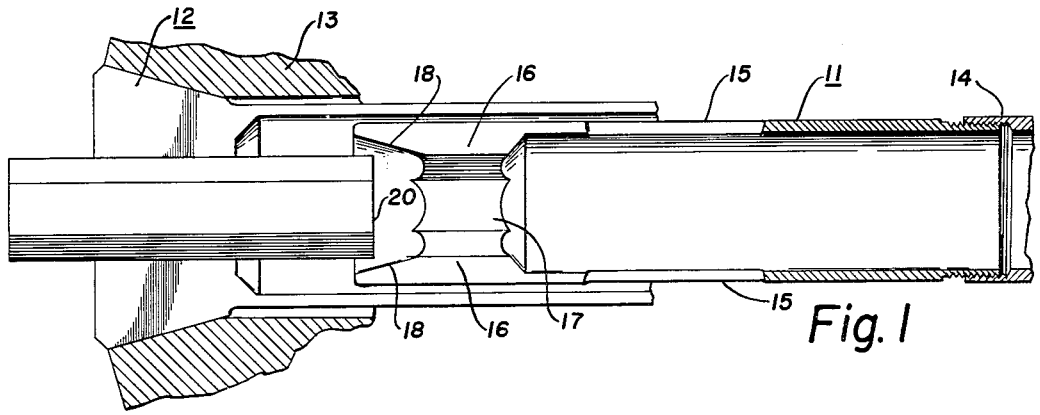
Figure 1 is a longitudinal, cross-sectional view of a pusher embodying my invention positioned within a collet and showing a terminal piece of stock held by the collet and released from the pusher.
Figure 2:
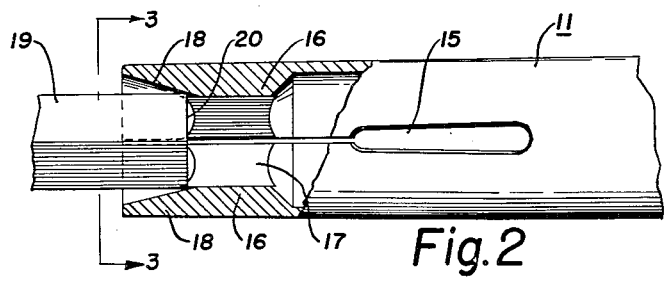
Figure 2 is a view of the forward end of my pusher, axially rotated 90 degrees from its position shown in Figure 1, and showing a terminal piece of stock abutting a forward face of the pusher.
Figure 3:
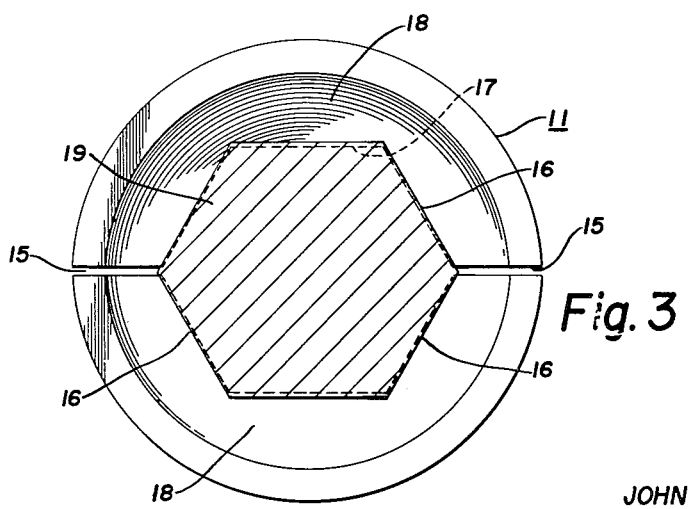
Figure 3 is an enlarged cross-sectional view taken through the line 3—3 of Figure 2.

In the feeding of bar stock into a machine, such as an automatic screw machine, a pusher feeds the stock to a collet. There is reciprocal movement of the collet and pusher relative to each other. The pusher is each of the reciprocal movements advances an increment of stock to the collet where it is held during a cutting operation. After each increment has been released from the collet, the stock is advanced into the collet and there held for another cutting operation. When the bar stock is nearly consumed, a terminal piece of bar stock may be positioned in the collet in advance of the pusher, as illustrated in Figure 1. Here the terminal piece of stock is held by the collet but is no longer held by the pusher.

In the next reciprocal movement of the pusher and terminal piece of stock toward each other, there is a shock encountered by their coming together. Also, because the collet is still being rotated and the pusher is no longer being driven by the collet through the connection of the stock, there is a lag in the rotational movement of the pusher relative to the terminal piece of stock. Thus, when the rear end of the terminal piece of stock and the forward face of the pusher come together, there is not only the shock of the encounter, but there is a further shock arising from the difference in the speed of rotation of the pusher relative to the terminal piece of stock.

My construction of a pusher is directed toward the minimizing of the above described disadvantages and drawbacks of previously known pushers in meeting this problem.

In the drawing, a pusher is shown and denoted generally by the reference character 11. The pusher is mounted axially of and within a collet 12. During the operation of the machine, of which the parts are illustrated, the collet 12 reciprocates to grasp and ungrasp stock advanced by the pusher 11 and thus there is reciprocal movement of the pusher and collet relative to each other. An actuating head 13, fragmentarily shown in Figure 1, has a champfered surface cooperating with a conical surface of the collet 12 in the well-known manner so as to cause the collet to expand and contract in its cycle of operations.

The rearward end of the pusher 11 is threadably secured to and carried by a supporting member or tube 14 carried by the machine.

The pusher 11 is of generally cylindrical form and has two opposite slits 15 in its walls running lengthwise of the pusher from its forward end. The slits 15 form two opposing fingers which are resilient and are so biased as to be contracted radially inward.

Adjacent the forward end of the pusher 11 there are six pad portions 16 which may be integral with the pusher, as shown in the drawing, or which may be separate and removable as desired. The pad portions 16 are arranged around and define a hexagon-shaped bore 17. In the compressed condition of the fingers, the bore 17 is slightly smaller than a true hexagon, but in the expanded condition of the fingers in which they grasp a hexagon-shaped piece of stock, the bore 17 assumes a complementary hexagon shape. In the illustration shown, the piece of stock is of hexagon shape by way of example. Because the stock is of hexagon shape in cross-section, the bore 17 is also of hexagon shape. The bore 17 may also be of polygonal shape and, as used here, the word "polygon" is used in its broadest sense so as to include three-sided, four-sided, five-sided and other sided figures and shapes, as well as six-sided figures. If a round piece of stock is being advanced by the pusher, then the bore 17 may correspondingly be of round shape so as to best accommodate such stock.

In the drawing, the stock has been advanced through the pusher to the collet to the position where there is only a terminal piece of stock 19 left. This terminal piece of stock 19 is held in the collet 12 but is no longer within the bore 17 of the pusher and hence the resilient fingers are in their contracted position.

Extending from adjacent the forward end of the pusher 11, there is a cup-shaped or sloping wall 18. This wall 18 extends at an angle to the axis of the pusher from adjacent the forward end of the pusher to the stock-receiving bore 17. Preferably, the angle of the inclination of the wall 18 to the axis of the pusher is on the order of 15 degrees; next preferably this angle of the sloping wall 18 to the axis of the pusher is from about 10 to 20 degrees; and next preferably, the same angle is of about five to 25 degrees, the order of preference being as here stated.

When the rear end 20 of the terminal piece 19 encounters the sloping wall 18 and there is axial thrust therebetween, the major component of force is directed radially outward and tends to expand outwardly the resilient fingers of the pusher. Thus, the major amount of force set up by the axial movement of the terminal piece 19 against the sloping wall 18 is absorbed by the resiliency of the tempered steel of the fingers. Thus, the shock of sudden impact between the pusher and the end 20 of terminal piece 19 is gradually absorbed or cushioned by the arrangement of the sloping wall 18, so arranged as to direct most of this force radially outward.

Also, the shock encountered by the differential in the rotary movements is gradually absorbed by this arrangement so that the pusher may gradually accelerate to approximately the same rotary speed as the terminal piece 19. The construction provides a smooth-working clutching action between the terminal piece 19 and the pusher so as to minimize shock and violent reaction between the two.

Considerable wear and tear on the pusher is avoided by this construction and shock and impact upon the machine is minimized. A smoother working operation is assured and there is less wear and breakage of the parts.

The present disclosure includes the disclosure contained in the appended claims, as well as the foregoing description and the drawing.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a pusher having resilient fingers for advancing polygon-shaped bar stock, the pusher having resilient fingers and a polygon-shaped stock-receiving bore, said bore having longitudinally extended inner angular corners for accommodating corners of the polygon-shaped bar stock, the pusher having a forward face engageable by the rearward end of a released last increment of stock upon axial movement of said pusher toward said last increment of stock, the improvement of said forward face being inclined rearwardly and radially from adjacent the forward end of the pusher to the stock-receiving bore at an angle of inclination to the axis of the pusher of less than 45 degrees to provide a camming surface for gradually expanding said resilient fingers by a component of force greater than the axially directed component of force on said pusher upon axial movement of one of said last increment of stock and said forward face toward the other, said forward face being extended rearwardly at said angle of inclination a greater distance intermediate of said inner angular corners of the stock-receiving bore than at said corners to provide the said camming surface required to meet the corners of said last increment of stock when said last increment of stock and said stock-receiving bore are out of phase with each other, whereby the shock of sudden engagement of said last increment of stock and said forward face during a lag in transmitted rotary motion is reduced.

2. In a pusher for advancing polygon-shaped bar stock, the pusher having resilient fingers and a polygon-shaped stock-receiving bore, said bore having longitudinally extended inner angular corners for accommodating corners of complementary polygon-shaped stock, said pusher having a forward face engageable by the rearward end of a released last increment of stock upon axial movement of said pusher toward said last increment of stock, the improvement of said forward face being inclined rearwardly and radially inward from adjacent the forward end of the pusher to the stock-receiving bore, the angle of inclination of said forward face being on the order of 15 degrees to provide a camming surface for gradually expanding said resilient fingers by a component of force greater than the axially directed component of force on said pusher upon axial movement of one of said pusher and last increment of stock toward the other, said forward face being extended rearwardly at said angle of inclination a maximum distance intermediate said inner corners of the stock-receiving bore and a minimum distance at said inner corners to assure meeting of said last increment by said camming surface at any out-of-phase relationship between said last increment of stock and said stock-receiving bore upon reciprocal movement together of said last increment of stock and said forward face.

3. In a pusher for advancing polygon-shaped bar stock, the pusher having resilient fingers and a polygon-shaped stock-receiving bore formed to accommodate complementary polygon-shaped stock, said pusher having a forward face engageable by the rearward end of a released last increment of said stock upon movement of said last increment of stock and said forward face together in an axial direction, the improvement of said forward face being inclined rearwardly and radially inward from adjacent the forward end of the pusher to the stock-receiving bore, the angle of inclination of said forward face to the axis of said pusher being from about 10 to 20 degrees to provide a camming surface for expanding said resilient fingers by a component of force in a radial direction greater than the axially directed component of force upon movement of said last increment of stock and said forward face together in an axial direction, said forward face converging with the flat sides of said polygon-shaped stock-receiving bore along converging lines forming arcs having their ends extending forwardly at the corners of the stock-receiving bore, said forward face extending rearwardly at said angle of inclination to said flat sides at the said converging lines to cammingly engage said last increment upon movement of the last increment and forward face together with said last increment and stock-receiving bore displaced in phase relationship.

4. In a pusher for advancing polygon-shaped bar stock, the pusher having resilient fingers and a polygon-shaped stock-receiving bore formed to accommodate complementary polygon-shaped stock, said pusher having a forward face engageable by the rearward end of a released last increment of said stock upon movement of said last increment of stock and said forward face together in an axial direction, the improvement of said forward face being inclined rearwardly and radially inward from adjacent the forward end of the pusher to the stock-receiving bore, the angle of inclination of said forward face to the axis of said pusher being from about 5 to 25 degrees to provide a camming surface for expanding said resilient fingers by a component of force in a radial direction greater than the axially directed component of force upon movement of said last increment of stock and said forward face together in an axial direction, said forward face converging with the flat sides of said polygon-shaped stock-receiving bore along converging lines forming arcs having their ends extending forwardly at the corners of the stock-receiving bore, said forward face extending rearwardly at said angle of inclination to said flat sides at the said converging lines to cammingly engage said last increment upon movement of the last increment and forward face together with said last increment and stock-receiving bore displaced in phase relationship.

References Cited in the file of this patent
UNITED STATES PATENTS

| | | |
|---|---|---|
| 1,449,505 | Fancher et al. | Mar. 27, 1923 |
| 1,538,442 | Mann | May 19, 1925 |
| 2,035,942 | Brinkman | Mar. 31, 1936 |
| 2,521,099 | Sheffer | Sept. 5, 1950 |